May 13, 1924.
F. G. FOLBERTH ET AL
ATTACHMENT FOR MOTOR VEHICLES
Filed Jan. 18, 1923
1,493,975
3 Sheets-Sheet 1
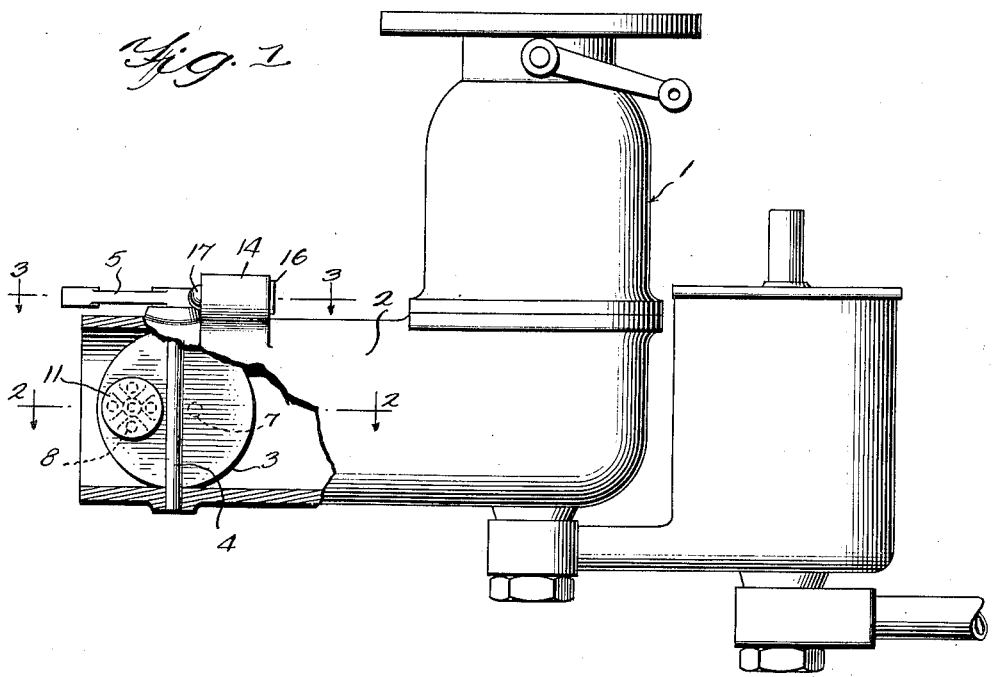
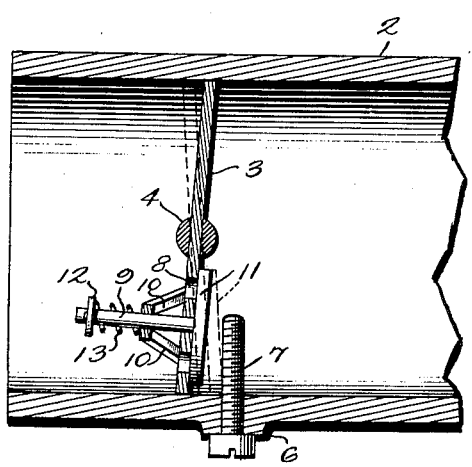
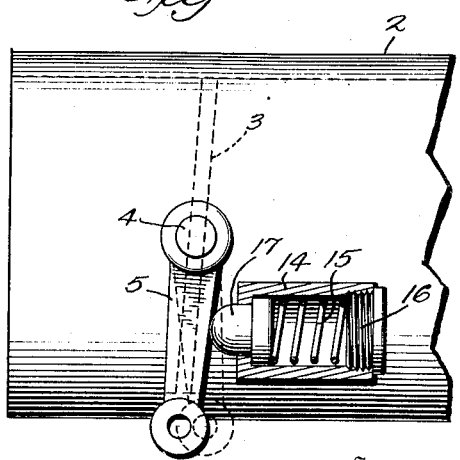
Inventors
F. G. Folberth
W. M. Folberth
By
Ch. Parker
Attorney May 13, 1924.
F. G. FOLBERTH ET AL
ATTACHMENT FOR MOTOR VEHICLES
Filed Jan. 18, 1923
1,493,975
3 Sheets-Sheet 2
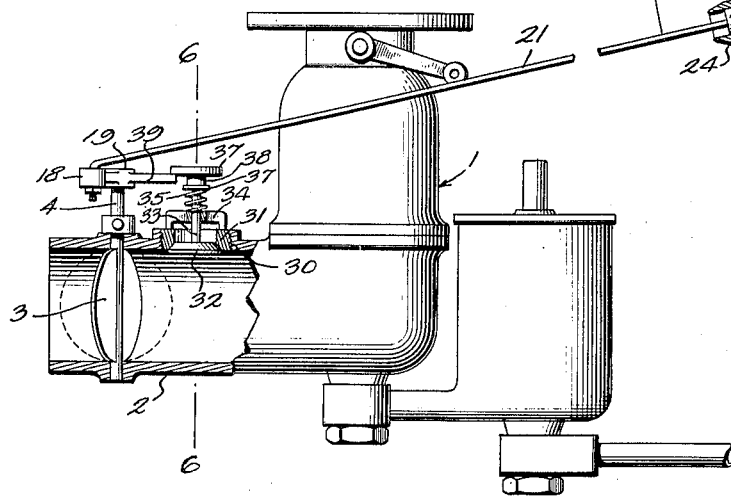
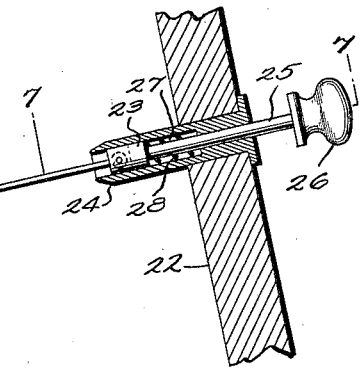
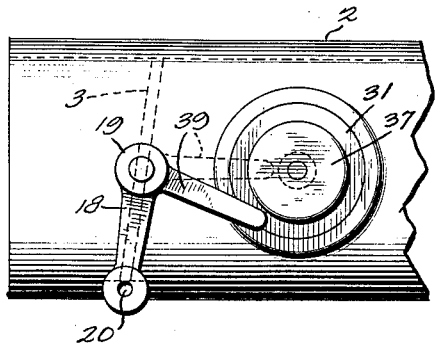
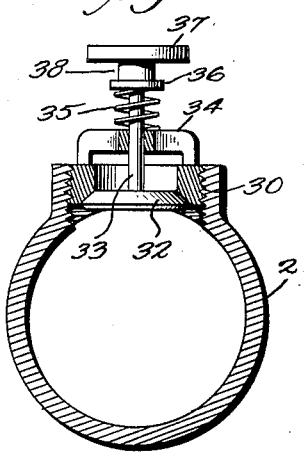
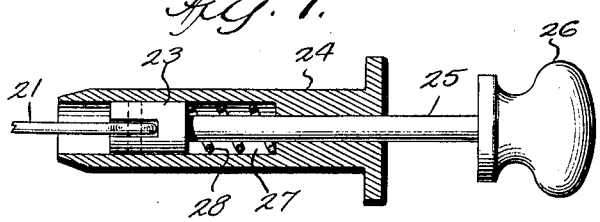
Inventors
F.G. Folberth
W.M. Folberth
By C.H. Parker
Attorney May 13, 1924.
F. G. FOLBERTH ET AL
1,493,975
ATTACHMENT FOR MOTOR VEHICLES
Filed Jan. 18, 1923   3 Sheets-Sheet 3
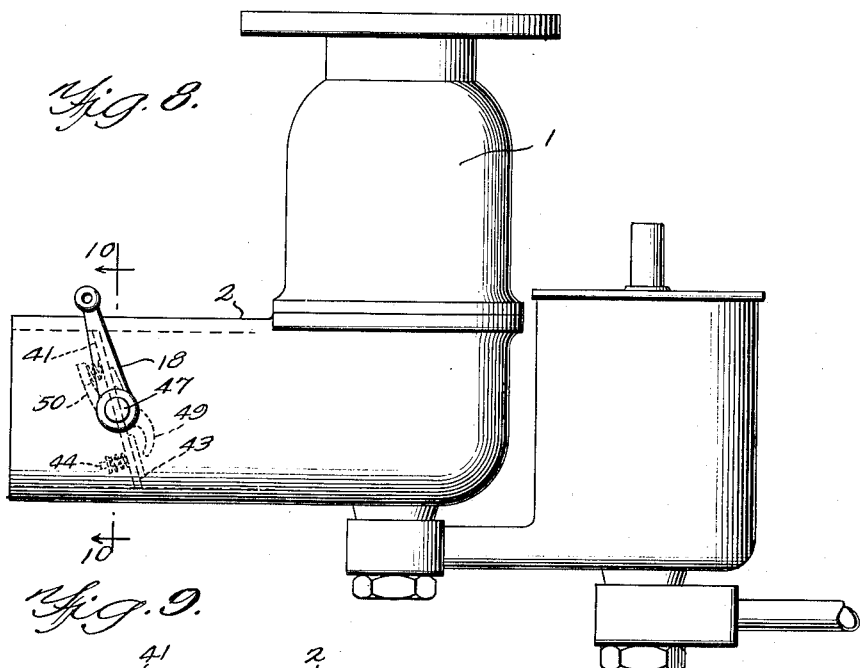
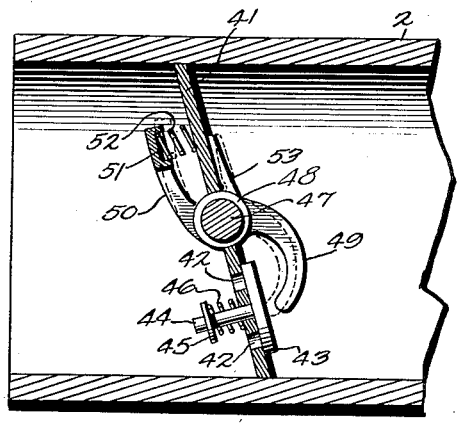
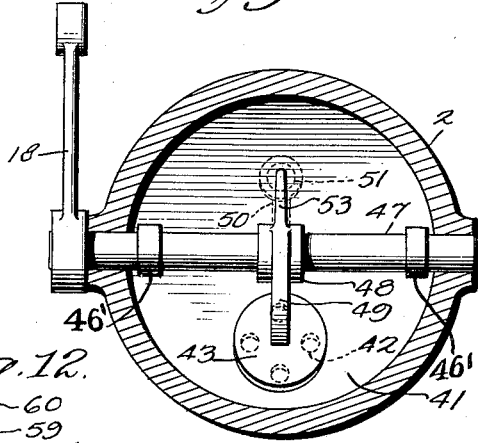
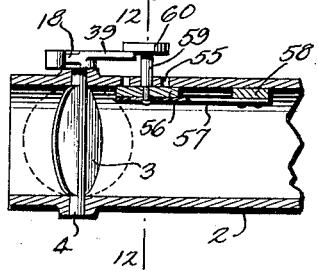
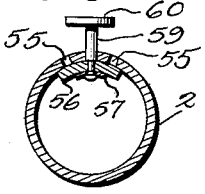
Inventors
F.G. Folberth
W.M. Folberth Patented May 13, 1924.

1,493,975

UNITED STATES PATENT OFFICE.

FREDERICK G. FOLBERTH AND WILLIAM M. FOLBERTH, OF CLEVELAND, OHIO, ASSIGNORS TO THE FOLBERTH AUTO SPECIALTY COMPANY, OF CLEVELAND, OHIO, A CORPORATION OF OHIO.

ATTACHMENT FOR MOTOR VEHICLES.

Application filed January 18, 1923. Serial No. 613,495.

*To all whom it may concern:*

Be it known that we, FREDERICK G. FOLBERTH and WILLIAM M. FOLBERTH, citizens of the United States, residing at Cleveland, in the county of Cuyahoga and State of Ohio, have invented certain new and useful Improvements in Attachments for Motor Vehicles, of which the following is a specification.

This invention relates to attachments for motor vehicles, and more particularly to chokers or priming devices.

In starting an engine on a cold morning, it is the usual practice to close the choker valve and draw in a charge of raw gas. After the motor has been started, it is necessary to progressively open the choker valve as the engine heats up to supply a desired amount of air for forming the charge. When the engine becomes heated to the proper running temperature, the choke valve should be fully opened. It has heretofore been the practice to provide a choke valve together with means for holding it in various adjusted positions and to manually operate the valve to set it at various adjustments from the fully closed position to a fully open position as the engine becomes warm.

In the present invention, we provide the usual choke valve and choke rod to control it with an auxiliary air valve which is maintained in closed position by the choke valve when the choke rod is moved to its extreme outer position. We further provide means for opening the auxiliary air valve when the pressure on the choke rod is released, whereby a sufficient amount of air will be automatically supplied to the charge.

An object of the invention is the provision of means for automatically supplying an amount of air sufficient for running an internal combustion engine while it is cold and less than the amount supplied in normal running when the choke valve is in fully open position.

In the accompanying drawings, we have shown several embodiments of the invention. In this showing:

Figure 1 is a side elevation of a carburetor showing an air intake pipe in section and showing one form of the invention, Figure 2 is a longitudinal sectional view on line 2—2 of Figure 1, Figure 3 is a similar view on line 3—3 of Figure 1, Figure 4 is a view similar to Figure 1, showing another form of the invention.

Figure 5 is a plan view of the air intake pipe of the carburetor,

Figure 6 is a vertical sectional view on line 6—6 of Figure 4,

Figure 7 is a detail sectional view on line 7—7 of Figure 4,

Figure 8 is a side elevation of a carburetor showing another form of the invention, Figure 9 is a central vertical sectional view of the air pipe showing the choke valve, Figure 10 is a detail sectional view on line 10—10 of Figure 8, Figure 11 is a sectional view of an air pipe showing another form of the invention, and, Figure 12 is a vertical sectional view on line 12—12 of Figure 11.

Referring to Figures 1 to 3 of the drawings, the reference numeral 1 designates generally a carburetor having an air pipe 2. A choke valve 3 of ordinary construction is arranged in the air pipe. This choke valve is mounted on a revoluble pin 4 and is provided with a handle 5, arranged exteriorly of the air pipe. The handle 5 is adapted to be connected to suitable operating means (not shown) on the dash of the vehicle to permit manual operation of the choke valve. Adjacent the choke valve, the pipe is provided with a boss 6 and a screw 7 is arranged in this boss extending into the interior of the pipe. A portion of the choke valve is provided with a plurality of openings 8, arranged concentrically of a valve stem 9. This valve stem passes through an opening in the choke valve and is mounted in a guide or frame 10, carried by the choke valve. The stem is adapted to carry a disk or valve 11. The upper end of the stem is adapted to receive a washer 12 and a spring 13 is arranged between the guide 10 and the washer 12.

Exteriorly of the air pipe, there is provided a casing 14, adapted to receive a coil spring 15. This spring bears against the bottom of the casing, which is shown in this instance as formed by a threaded plug 16. The other end of the spring engages an operating member 17 which is normally projected from the casing by the spring and is adapted to engage the operating arm 5 when the choke valve is in closed position, as shown in Figure 3 of the drawings.

In the form of the invention shown in Figures 4 to 7 of the drawings, the construction of the carburetor, air pipe, and choke valve are substantially the same. The pin 4 is adapted to receive a crank 18, which is provided with a sleeve or bearing portion 19 on its inner end. This sleeve or bearing portion is arranged on the pin, as shown. The outer end of the crank is provided with an opening 20, adapted to receive one end of a choke rod 21. This choke rod is extended upwardly to the dash 22, and is received in a block 23, mounted in a bushing 24. The block is connected to a stem 25, having a handle 26 on its inner end. The block is arranged in a recess 27 in the bushing and a coil spring 28 is arranged between the bottom of the recess and the block.

The air pipe is provided with an opening 30, arranged inwardly of the choke valve and this opening is threaded to receive a valve seat 31. A poppet valve 32 is normally adapted to engage this seat. The valve is provided with a stem 33, passing through a guide 34, carried by the valve seat and this stem is surrounded by a coil spring 35. The lower end of the spring bears against the guide and the upper end bears against a disk 36, normally retaining the valve in closed position. A second disk 37 is spaced from the disk 36, forming a groove 38. The crank 18 carries an arm or projection 39, which is adapted to be received in this groove when the choke valve is in fully closed position.

In the form of the invention shown in Figures 8 to 10 of the drawings, the choke valve 41 is provided with a plurality of openings 42, arranged concentrically of an auxiliary valve 43. This valve is mounted on a stem 44, passing through an opening in the body of the choke valve. A washer 45 is arranged adjacent the end of the valve stem, and a coil spring 46 is arranged between this washer and the body of the choke valve. The choke valve is secured to sleeve 46' mounted on a pin 47. This pin is also surrounded by a sleeve 48, having an arm 49 projecting on one side of the choke valve to a point near the auxiliary valve. On the opposite side, there is provided an arm 50, the outer end of which forms a cup 51. A spring 52 is arranged between this cup and the body of the choke valve. The sleeve 48 is further provided with a finger 53, which is adapted to engage the opposite face of the choke valve.

The form of the invention shown in Figures 11 and 12 is substantially similar to that shown in Figures 4 to 7. In this form of the invention, the air pipe is provided with a plurality of openings 55, normally closed by a valve 56. This valve is secured to a leaf spring 57, and the end of the spring is secured to a plate or block 58, arranged on the interior of the air pipe. The valve is provided with a stem 59, projecting to the exterior of the air pipe and the outer end of this stem is provided with a disk 60. The projection 39, carried by the crank 18 is adapted to be received under this disk, as shown in Figure 11 of the drawings.

The operation of the device will be apparent from the foregoing description. When the engine is first started, the choke rod is pulled out to its extreme position to completely close the choke valve and draw in a raw charge of gas. In the form of the invention shown in Figures 1 to 3 of the drawings, the choke valve is then in the dotted line position shown in Figure 2, and the screw 7 engages the auxiliary valve 11 to maintain it in closed position. The crank or arm 5 is also in the dotted line position shown in Figure 3 of the drawings which forces the operating member 17 inwardly and compresses the spring 15. As soon as one or more explosions take place in the engine cylinders, the operator releases the choke rod and the spring 15 moves the arm 5 to the full line position shown in Figure 3 of the drawings, and thus moves the choke valve to the full line position shown in Figure 2 of the drawings. The choke valve is still closed and no air is fed to the carburetor around this valve. However, the auxiliary valve 11 is then spaced from the screw 7, as shown in Figure 2 of the drawings, and the suction of the engine moves this valve to open position, allowing a flow of air to pass through the openings 8.

In the form of the invention shown in Figures 4 to 7 of the drawings, the operation of the choke rod 21 compresses the spring 28. When the choke valve is in the fully closed position, the projection 39 carried by the crank 18 is arranged in the groove 38, preventing the auxiliary valve 32 from being opened. As soon as one or more explosions take place in the engine cylinders, the operator releases the choke rod and the spring 28 moves it to the position shown in Figure 7 of the drawings. The choke valve is still in the closed position but the projection 39 has assumed the full line position shown in Figure 5 of the drawings and the auxiliary valve 32 is free to open. The suction of the engine opens this valve against the tension of the spring 35 and supplies a small amount of air to the carburetor. When the engine becomes properly heated, the choke valve may be moved to an open position by moving the handle 26 inwardly until it engages the top of the plug or bushing 24.

In the operation of the form of the invention shown in Figures 8 to 10 of the drawings, an outward movement of the choke rod to its extreme position revolves the sleeve 48 through the finger 53, and causes the arms 49 and 50 to assume the dotted line positions. The arm 49 then maintains the auxiliary valve 43 in closed position and the arm 50 compresses the spring 52. A release of pressure on the choke rod still maintains the choke valve in closed position and permits the arms 49 and 50 to assume their full line position, due to the force of spring 52. This slightly spaces the end of the arm 49 from the auxiliary valve 43 and the suction of the engine opens this valve.

In the form of the invention shown in Figures 11 and 12 of the drawings, the opration is substantially the same as in the form in Figures 4 to 7 of the drawings, except that a leaf spring 57 is employed to normally hold the auxiliary valve 56 in closed position, and the suction of the engine opens the valve against the tension of this spring.

It is to be understood that the forms of our invention herewith shown and described are to be taken as preferred examples of the same and that various changes in the shape, size, and arrangement of parts may be resorted to without departing from the spirit of the invention or the scope of the subjoined claims.

We claim:

1. In a device of the character described, a choke valve, operating means therefor, and auxiliary air supply means, said air supply being adapted to be closed by the movement of said operating means to one position and being operated by suction when the operating means is released.

2. In a device of the character described, a choke valve, operating means therefor, said operating means being capable of movement after said choke valve is closed, and an auxiliary air supply adapted to be closed by the additional movement of said operating means and being adapted to be opened by suction when said choke valve is in normal position and said operating means released.

3. In a device of the character described, a choke valve, operating means therefor, and an auxiliary valve adapted to feed air when said choke valve is closed, said valve being closed by said operating means and being free to open prior to the opening of said choke upon partial release of said operating means.

4. In a device of the character described, a choke valve to supply air when said choke valve is closed, and operating means connected to said choke valve, said operating means being capable of additional movement after closing said choke valve to close said auxiliary valve, and said auxiliary valve being normally free to open upon the creation of a partial vacuum in the air pipe.

5. In a device of the character described, a choke valve arranged in the air pipe of a carburetor, an auxiliary valve capable of supplying air to said pipe when said choke valve is closed, operating means connected to said choke valve and adapted to be moved in one direction to close said choke valve, said operating means being capable of further movement after said choke valve is closed, and a spring adapted to retain said auxiliary valve in a closed position, said spring being actuated by said further movement of the operating means.

6. In a device of the character described, a choke valve arranged in the air pipe of a carburetor, an auxiliary valve capable of supplying air to said pipe when said choke valve is closed, operating means connected to said choke valve and adapted to be moved in one direction to close it, said operating means being capable of further movement after said choke valve is closed, said auxiliary valve being adapted to be opened by suction in said air pipe, a spring to normally retain said auxiliary valve in closed position, and means controlled by the further movement of said operating means to prevent opening of said auxiliary valve.

7. In a device of the character described, a choke valve arranged in the air pipe of a carburetor, an auxiliary valve capable of supplying air to said pipe when said choke valve is closed, operating means connected to said choke valve and adapted to be moved in one direction to close it, said operating means being capable of further movement after said choke valve is closed, said auxiliary valve being adapted to be opened by suction in said air pipe, a spring to normally retain said auxiliary valve in closed position, means controlled by the further movement of said operating means to prevent opening of said auxiliary valve, and means for limiting the movement of said auxiliary valve.

In testimony whereof, we affix our signatures.

FREDERICK G. FOLBERTH.
WILLIAM M. FOLBERTH.

Certificate of Correction.

It is hereby certified that in Letters Patent No. 1,493,975, granted May 13, 1924, upon the application of Frederick G. Folberth and William M. Folberth, of Cleveland, Ohio, for an improvement in "Attachments for Motor Vehicles," an error appears in the printed specification requiring correction as follows: Page 3, line 68, claim 4, after the word " valve " insert the words *an auxiliary valve;* and that the said Letters Patent should be read with this correction therein that the same may conform to the record of the case in the Patent Office.

Signed and sealed this 15th day of July, A. D. 1924.

[SEAL.]
THOMAS E. ROBERTSON,
*Commissioner of Patents.*